(12) United States Patent
Seo et al.

(10) Patent No.: US 8,145,033 B2
(45) Date of Patent: *Mar. 27, 2012

(54) RECORDING MEDIUM HAVING DATA STRUCTURE FOR MANAGING REPRODUCTON DURATION OF STILL PICTURES RECORDED THEREON AND RECORDING AND REPRODUCING METHODS AND APPARATUSES

(75) Inventors: Kang Soo Seo, Kyunggi-do (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 829 days.

This patent is subject to a terminal disclaimer.

(21) Appl. No.: 10/766,211

(22) Filed: Jan. 29, 2004

(65) Prior Publication Data

US 2004/0184780 A1 Sep. 23, 2004

Related U.S. Application Data

(60) Provisional application No. 60/444,978, filed on Feb. 5, 2003.

(30) Foreign Application Priority Data

Feb. 7, 2003 (KR) .......................... 10-2003-007894

(51) Int. Cl.
*H04N 9/80* (2006.01)
(52) U.S. Cl. ........................................ 386/241; 386/248
(58) Field of Classification Search .................. None
See application file for complete search history.

(56) References Cited

U.S. PATENT DOCUMENTS

| 4,164,760 | A  | 8/1979  | Inaba et al.    |
|-----------|----|---------|-----------------|
| 5,854,873 | A  | 12/1998 | Mori et al.     |
| 5,870,523 | A  | 2/1999  | Kikuchi et al.  |
| 5,884,004 | A  | 3/1999  | Sato et al.     |
| 5,999,698 | A  | 12/1999 | Nakai et al.    |
| 6,064,379 | A  | 5/2000  | DeMoney         |
| 6,122,436 | A  | 9/2000  | Okada et al.    |
| 6,157,769 | A  | 12/2000 | Yoshimura et al.|
| 6,266,483 | B1 | 7/2001  | Okada et al.    |
| 6,285,826 | B1 | 9/2001  | Murase et al.   |
| 6,308,005 | B1 | 10/2001 | Ando et al.     |
| 6,341,196 | B1 | 1/2002  | Ando et al.     |

(Continued)

FOREIGN PATENT DOCUMENTS

AU           6672298           9/1998

(Continued)

OTHER PUBLICATIONS

International Search Report, Dated Jul. 30, 2003.

(Continued)

*Primary Examiner* — William C Vaughn, Jr.
*Assistant Examiner* — Heather Jones
(74) *Attorney, Agent, or Firm* — Harness, Dickey & Pierce, P.L.C.

(57) ABSTRACT

The data structure includes a playlist area storing at least one playlist. The playlist includes at least one playitem and at least one sub-playitem. The playitem provides navigation information indicating at least one still picture from a first file to reproduce and provides duration information for display of the still picture, and the sub-playitem provides navigation information for reproducing audio data from a second file.

7 Claims, 10 Drawing Sheets

U.S. PATENT DOCUMENTS

| | | |
|---|---|---|
| 6,353,702 B1 | 3/2002 | Ando et al. |
| 6,369,835 B1 | 4/2002 | Lin |
| 6,374,037 B1 | 4/2002 | Okada et al. |
| 6,385,389 B1 | 5/2002 | Maruyama et al. |
| 6,393,430 B1 | 5/2002 | Van Ryzin |
| 6,400,893 B1 | 6/2002 | Murase et al. |
| 6,442,337 B1 | 8/2002 | Okada et al. |
| 6,470,460 B1 | 10/2002 | Kashiwagi et al. |
| 6,493,504 B1 | 12/2002 | Date et al. |
| 6,529,683 B2 * | 3/2003 | Mori et al. ............ 386/96 |
| 6,532,335 B2 | 3/2003 | Otomo et al. |
| 6,574,419 B1 | 6/2003 | Nonomura et al. |
| 6,580,870 B1 | 6/2003 | Kanazawa et al. |
| 6,594,442 B1 | 7/2003 | Kageyama et al. |
| 6,748,415 B1 | 6/2004 | Sugimoto |
| 6,798,976 B2 | 9/2004 | Tsumagari et al. |
| 6,823,010 B1 | 11/2004 | Curet et al. |
| 6,829,211 B2 | 12/2004 | Sako et al. |
| 6,943,684 B2 | 9/2005 | Berry |
| 6,999,674 B1 | 2/2006 | Hamada et al. |
| 7,054,545 B2 * | 5/2006 | Ando et al. ............ 386/96 |
| 7,224,890 B2 | 5/2007 | Kato |
| 7,343,052 B2 | 3/2008 | Roth et al. |
| 2001/0000809 A1 | 5/2001 | Ando et al. |
| 2001/0016112 A1 | 8/2001 | Heo et al. |
| 2001/0043790 A1 | 11/2001 | Saeki et al. |
| 2001/0046371 A1 | 11/2001 | Ando et al. |
| 2001/0056580 A1* | 12/2001 | Seo et al. ............ 725/152 |
| 2002/0025143 A1 | 2/2002 | Kashiwagi et al. |
| 2002/0035575 A1 | 3/2002 | Taira et al. |
| 2002/0048228 A1 | 4/2002 | Sako et al. |
| 2002/0085022 A1 | 7/2002 | Masuda et al. |
| 2002/0127001 A1 | 9/2002 | Gunji et al. |
| 2002/0135607 A1 | 9/2002 | Kato et al. |
| 2002/0135608 A1 | 9/2002 | Hamada et al. |
| 2002/0145702 A1* | 10/2002 | Kato et al. ............ 352/1 |
| 2002/0164152 A1 | 11/2002 | Kato et al. |
| 2002/0172496 A1 | 11/2002 | Gunji et al. |
| 2002/0176695 A1 | 11/2002 | Sawabe et al. |
| 2003/0014760 A1 | 1/2003 | Yamauchi et al. |
| 2003/0235406 A1 | 12/2003 | Seo et al. |
| 2004/0057700 A1 | 3/2004 | Okada et al. |
| 2004/0081434 A1* | 4/2004 | Jung et al. ............ 386/95 |
| 2004/0141436 A1 | 7/2004 | Monahan |
| 2004/0179820 A1 | 9/2004 | Kashiwagi et al. |
| 2004/0184780 A1 | 9/2004 | Seo et al. |
| 2004/0213552 A1 | 10/2004 | Kato |
| 2005/0025461 A1 | 2/2005 | Kato et al. |
| 2005/0066352 A1 | 3/2005 | Herley |
| 2005/0078948 A1 | 4/2005 | Yoo et al. |
| 2005/0105888 A1 | 5/2005 | Hamada et al. |
| 2005/0163463 A1 | 7/2005 | Schick et al. |
| 2005/0196143 A1 | 9/2005 | Kato et al. |
| 2005/0201718 A1 | 9/2005 | Kato |
| 2005/0254363 A1 | 11/2005 | Hamada et al. |
| 2006/0195633 A1 | 8/2006 | Plourde, Jr. |
| 2006/0288302 A1 | 12/2006 | Yahata et al. |

FOREIGN PATENT DOCUMENTS

| | | |
|---|---|---|
| AU | 2003 282415 | 6/2004 |
| CN | 1240293 | 1/2000 |
| CN | 1245956 | 3/2000 |
| CN | 1263672 | 8/2000 |
| CN | 1063863 | 3/2001 |
| CN | 1303094 | 7/2001 |
| CN | 1304533 | 7/2001 |
| CN | 1381137 | 11/2002 |
| DE | 69907758 | 2/2004 |
| DE | 60002774 | 3/2004 |
| EP | 0856849 | 8/1995 |
| EP | 0 737 980 | 10/1996 |
| EP | 0978994 | 2/2000 |
| EP | 1045393 | 10/2000 |
| EP | 1 056 094 | 11/2000 |
| EP | 0949825 | 11/2000 |
| EP | 1 102 270 | 5/2001 |
| EP | 1 103 974 | 5/2001 |
| EP | 1113439 | 7/2001 |
| EP | 1 128 386 | 8/2001 |
| EP | 0942609 | 10/2001 |
| EP | 1 198 133 | 4/2002 |
| EP | 1 286 544 | 2/2003 |
| EP | 1300851 | 4/2003 |
| EP | 1041566 | 5/2003 |
| EP | 1204269 | 11/2003 |
| EP | 1 550 121 | 3/2004 |
| FR | 2581771 | 11/1986 |
| GB | 2119151 | 11/1983 |
| GB | 2 359 210 | 8/2001 |
| JP | 1-300777 | 12/1989 |
| JP | 06-311481 | 11/1994 |
| JP | 07-057436 | 3/1995 |
| JP | 07-262646 | 10/1995 |
| JP | 09-017101 | 1/1997 |
| JP | 10-154373 | 6/1998 |
| JP | 2000-004421 | 1/2000 |
| JP | 2000-020554 | 1/2000 |
| JP | 2000-041212 | 2/2000 |
| JP | 2000-059714 | 2/2000 |
| JP | 2000-333126 | 11/2000 |
| JP | 2001-052467 | 2/2001 |
| JP | 2001-069460 | 3/2001 |
| JP | 2001-078123 | 3/2001 |
| JP | 2001-86458 | 3/2001 |
| JP | 2001-103417 | 4/2001 |
| JP | 2001-155466 | 6/2001 |
| JP | 2001-157155 | 6/2001 |
| JP | 2001-167529 | 6/2001 |
| JP | 2001-216739 | 8/2001 |
| JP | 2001-231015 | 8/2001 |
| JP | 2001-243721 | 9/2001 |
| JP | 2002-056651 | 2/2002 |
| JP | 2002-082684 | 3/2002 |
| JP | 2002-157835 | 5/2002 |
| JP | 2002-158972 | 5/2002 |
| JP | 2002-208258 | 7/2002 |
| JP | 2002-325221 | 11/2002 |
| JP | 2002-354424 | 12/2002 |
| JP | 2003-016764 | 1/2003 |
| JP | 2003-045154 | 2/2003 |
| JP | 2003-299015 | 10/2003 |
| JP | 2004-336566 | 11/2004 |
| KR | 1998-0086030 | 12/1998 |
| KR | 1999-0070106 | 9/1999 |
| KR | 10-2000-0002840 | 1/2000 |
| KR | 2000-2921 | 1/2000 |
| KR | 2000-2922 | 1/2000 |
| KR | 10-2000-0014419 | 3/2000 |
| KR | 10-2000-0018987 | 4/2000 |
| KR | 10-2001-0013565 | 2/2001 |
| KR | 10-2001-0021485 | 3/2001 |
| KR | 1020010027114 | 4/2001 |
| KR | 10-2001-0051295 | 6/2001 |
| KR | 2001-66211 | 7/2001 |
| KR | 10-2002-0021402 | 3/2002 |
| KR | 2002-64463 | 8/2002 |
| KR | 10-2003-0064546 | 8/2003 |
| TW | 517495 | 1/2003 |
| WO | WO 98/37699 | 8/1998 |
| WO | WO 99/53694 | 10/1999 |
| WO | WO 00/55857 | 9/2000 |
| WO | WO 00/60598 | 10/2000 |
| WO | WO 00/74061 | 12/2000 |
| WO | WO 01/82608 | 11/2001 |
| WO | WO 00/33532 | 3/2002 |
| WO | WO 02/062061 | 8/2002 |
| WO | WO 2004/023234 | 3/2004 |
| WO | WO 2004-023484 | 3/2004 |
| WO | WO 2004-023485 | 3/2004 |

OTHER PUBLICATIONS

European Telecommunications Standards Institute, "Digital Video Broadcasting (DVB); Subtitling systems", 1997, pp. 1-45.

Japanese Office Action cited for a counterpart Japanese Application, dated May 20, 2008 (w/o translation).

European Patent Office Office Action cited for a counterpart European Application, dated May 16, 2008.
European Patent Office Search Report dated Sep. 1, 2008 for counterpart European Application.
Office Action dated Aug. 8, 2008 by the Chinese Patent Office for counterpart Chinese application.
Office Action dated Sep. 16, 2008 by the Japanese Patent Office for counterpart Japanese application.
Office Action dated Oct. 31, 2008 by the Chinese Patent Office for counterpart Chinese application.
Office Action dated Dec. 5, 2008 by the Chinese Patent Office for counterpart Chinese application, with English translation.
Office Action by Canadian Patent Office dated Dec. 10, 2009 for counterpart Canadian Application No. 2,474,229.
Notice of Allowance dated Jun. 23, 2010 by the Korean Patent Office for Application No. 10-2005-7014291.
Notice of Allowance dated Jul. 16, 2010 by the Japanese Patent Office for Application No. 2004-553272 with English translation.
Office Action dated Jul. 15, 2010 by the USPTO for U.S. Appl. No. 10/718,629.
Office Action by USPTO dated Feb. 4, 2010 for counterpart U.S. Appl. No. 10/716,629.
Office Action by Australian Patent Office dated Jun. 1, 2009 for counterpart Australian Application No. 200326974.
Japanese Office Action dated Oct. 22, 2010, issued in Application No. 2004-553273.
Canadian Office Action dated Oct. 20, 2010, issued in Canadian Application No. 2,474,229.
Notice of Allowance dated May 16, 2011, in corresponding U.S. Appl. No. 10/716,629.
Office Action dated Dec. 8, 2010 in corresponding Canadian Application No. 2 515 954.

* cited by examiner

```
PES_packet {

PES_packet_header {

PTS         # Presentation start time of the Subtitle unit

DTS         # Decoding start time of the Subtitle unit
    }
    PES_payload {

- - - - -

Cut in time & Cut out time

- - - - -        # The relative time from PTS in PES_packet_header

}
}
```

US 8,145,033 B2

RECORDING MEDIUM HAVING DATA STRUCTURE FOR MANAGING REPRODUCTON DURATION OF STILL PICTURES RECORDED THEREON AND RECORDING AND REPRODUCING METHODS AND APPARATUSES

DOMESTIC PRIORITY

The present invention claims priority under 35 U.S.C. 119 on Provisional Application No. 60/444,978 filed Feb. 5, 2003; the contents of which are incorporated by reference in their entirety.

FOREIGN PRIORITY

The present invention claims priority under 35 U.S.C. 119 on Korean Application No. 10-2003-007894 filed Feb. 7, 2003; the contents of which are incorporated by reference in their entirety.

BACKGROUND OF THE INVENTION

1. Field of the Invention

The present invention relates to a recording medium having a data structure for managing reproduction of at least still pictures recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available in the near future. The Blu-ray Disc Rewritable (BD-RE) and Blu-ray Disk ROM (BD-ROM) are examples of these new optical disks.

While the standard for BD-RE has been published, the standardization for high-density read-only optical disks such as the Blu-ray ROM (BD-ROM) is still under way. Consequently, an effective data structure for managing reproduction of still pictures recorded on the high-density read-only optical disk such as a BD-ROM is not yet available.

SUMMARY OF THE INVENTION

The recording medium according to the present invention includes a data structure for managing reproduction of at least still pictures recorded on the recording medium.

In one exemplary embodiment, the recording medium includes a playlist area storing at least one playlist. The playlist includes at least one playitem and at least one sub-playitem. The playitem provides navigation information indicating at least one still picture from a first file to reproduce and provides duration information for display of the still picture. The sub-playitem provides navigation information for reproducing audio data from a second file.

In one embodiment, the duration information indicates whether to display the still picture for one of a finite and an infinite period of time. Also, the duration information may indicate a length of time to display the still picture when the duration information indicates to display the still picture for a finite period of time.

In another exemplary embodiment, the recording medium includes a data area storing presentation data where the presentation data is divided into a number of still picture units. Each still picture unit includes at least one still picture and associated related data. A navigation area of the recording medium stores at least one playlist, and the playlist includes at least one playitem. The playitem indicates at least one of the still picture units to reproduce and provides duration information for display of the still picture in the still picture unit.

In one exemplary embodiment, the related data includes graphics data, subtitle data, or etc.

In a further exemplary embodiment, the playlist further includes at least one sub-playitem, and the sub-playitem provides navigation information for reproducing the audio data from the second file.

In one embodiment, the duration information indicates whether to display the still picture for one of a finite and an infinite period of time. Also, the duration information may indicate a length of time to display the still picture when the duration information indicates to display the still picture for a finite period of time.

The present invention further provides apparatuses and methods for recording and reproducing the data structure according to the present invention, and recording and reproducing slide shows according to the present invention.

BRIEF DESCRIPTION OF THE DRAWINGS

The above features and other advantages of the present invention will be more clearly understood from the following detailed description taken in conjunction with the accompanying drawings, in which.

DESCRIPTION OF THE EMBODIMENTS

In order that the invention may be fully understood, exemplary embodiments thereof will now be described with reference to the accompanying drawings.

Figure 1:
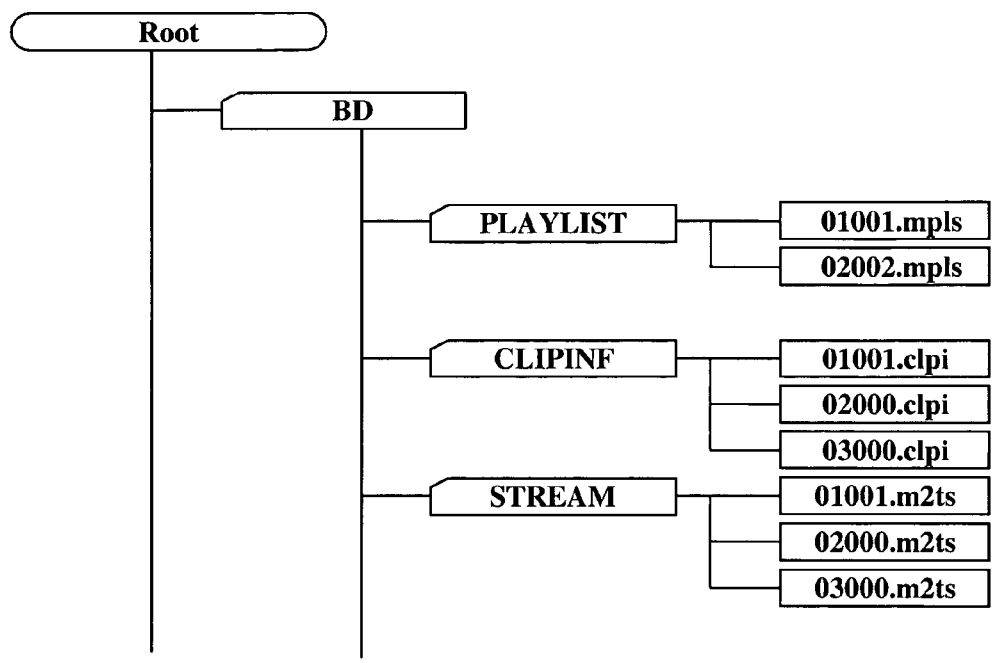
FIG. 1 illustrates an exemplary embodiment of a recording medium file or data structure according to the present invention.

A high-density recording medium such as a high density optical disk, for example, a Blu-Ray ROM (BD-ROM), BD-RE, etc. in accordance with the invention may have a file or data structure for managing reproduction of video and audio data as shown in FIG. 1. Some aspects of the data structure according to the present invention shown in FIG. 1 are the same as the well-known BD-RE standard, as such these aspects will be reviewed, but not described in great detail.

As shown in FIG. 1, the root directory contains at least one BD directory. The BD directory includes general files (not shown), a PLAYLIST directory in which playlist files (e.g., *.mpls) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clip streams files or just clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip file (e.g., presentation time stamps on an ATC or STC basis). The playlist file may also include sub-playitems that also provide a pair of IN-point and OUT-point that point to positions on a time axis of a clip file. Expressed another way, the playlist file identifies playitems and sub-playitems, each playitem or sub-playitem points to a clip file or portion thereof and identifies the clip information file associated with the clip file. The clip information file is used, among other things, to map the playitems to the clip file of source packets. Playlists may also include playlist marks which point to specific places (e.g., a specific address) in a clip file The general information files (not shown) provide general information for managing the reproduction of the A/V streams recorded on the optical disk.

Figure 2:
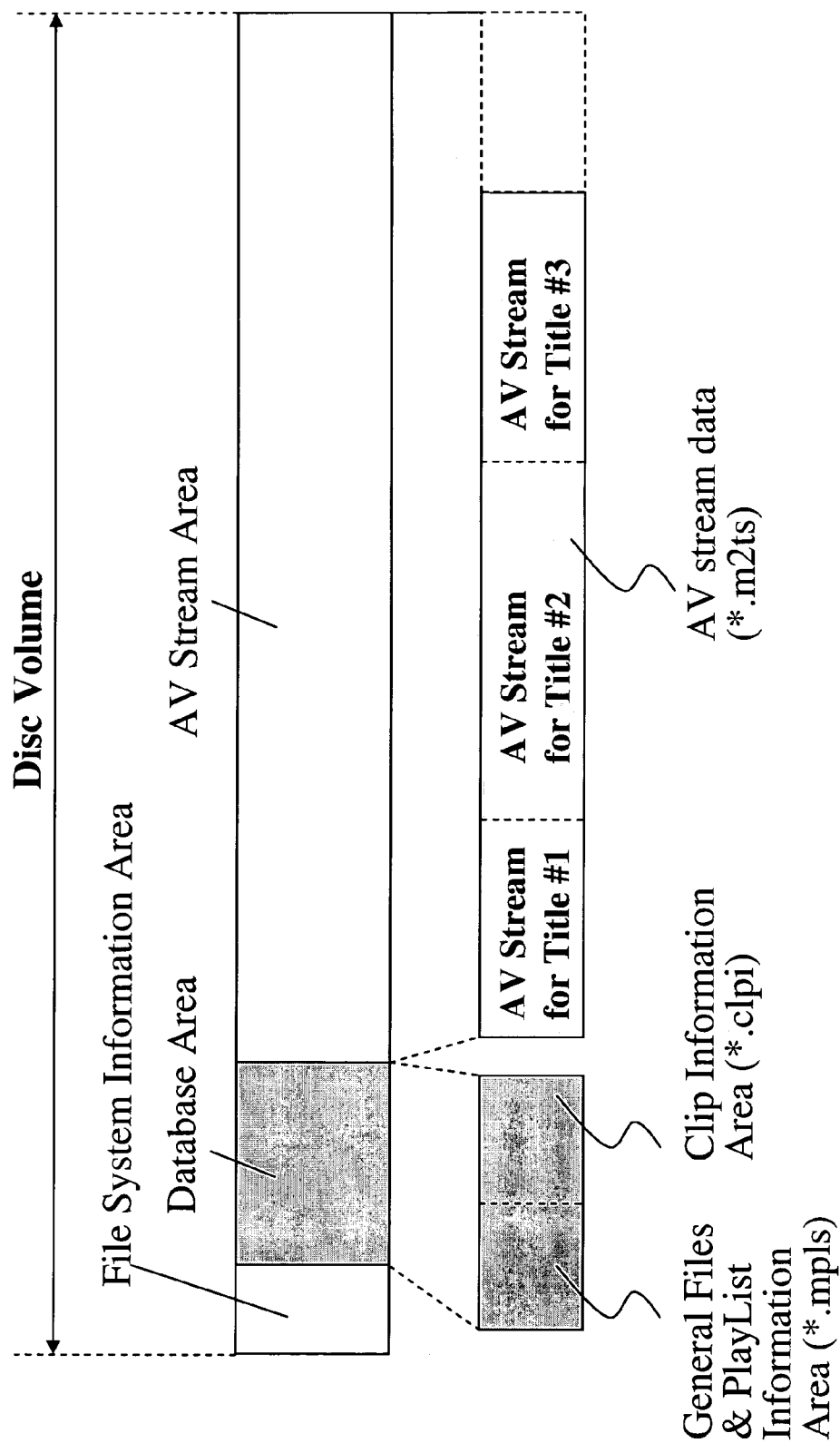
FIG. 2 illustrates an example of a recording medium having the data structure of FIG. 1 stored thereon.

In addition to illustrating the data structure of the recording medium according to an embodiment of the present invention, FIG. 1 represents the areas of the recording medium. For example, the general information files are recorded in one or more general information areas, the playlist directory is recorded in one or more playlist directory areas, each playlist in a playlist directory is recorded in one or more playlist areas of the recording medium, etc. FIG. 2 illustrates an example of a recording medium having the data structure of FIG. 1 stored thereon. As shown, the recording medium includes a file system information area, a data base area and an A/V stream area. The data base area includes a general information file and playlist information area and a clip information area. The general information file and playlist information area have the general information files recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM and BD-RE optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version, camera angle, etc. represents a different reproduction path, and the video data in these instances is referred to as multiple reproduction path video data.

Because of the large storage capacity of the newer, high-density recording media such as BD-ROM still images or pictures may be recorded and reproduced in an organized and/or user interactive fashion, for example, as slideshows. The data structure for managing reproduction of still pictures for a high-density recording medium in accordance with embodiments of the present invention will be described along with methods and apparatuses according to embodiments of the present invention for recording and reproducing still images.

Figure 3:
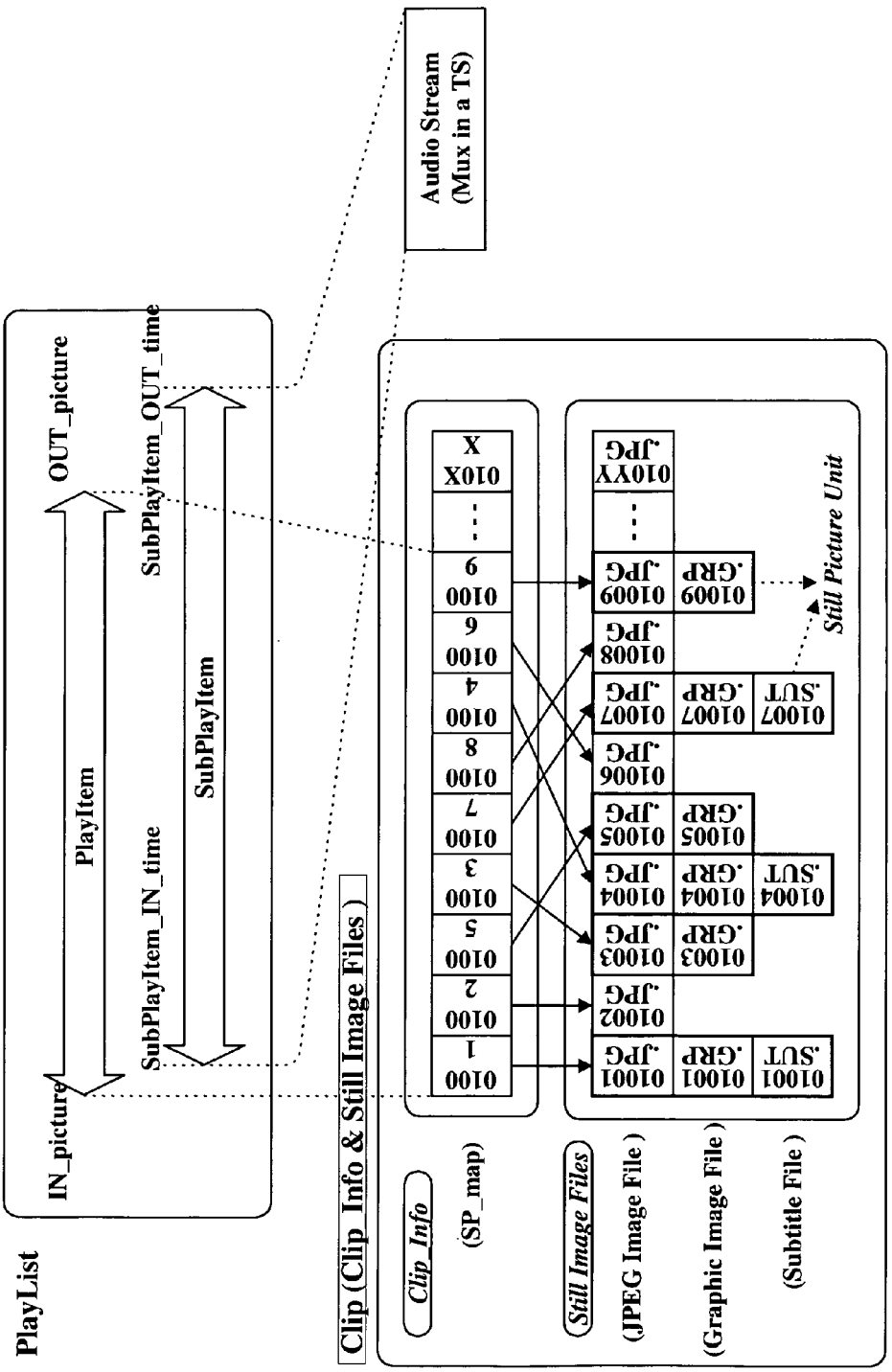
FIG. 3 illustrates a detailed embodiment of portions of the data structure in FIG. 1 and a method for managing still images of a high-density recording medium according to the present invention.

FIG. 3 illustrates an embodiment of a data structure and method for managing still images of a high-density recording medium such as a BD-ROM. As shown in FIG. 3, a clip includes a clip file of still image files and a clip information file. The clip file includes a still picture data file (e.g., a JPEG data file) and related data files (e.g., the graphic & subtitle data files) to be reproduced in synchronization therewith grouped into still picture units. In the example of FIG. 3, each still picture unit includes a single still picture (e.g., the JPEG file). Furthermore, the files in each still picture unit share the same file name except for their file name extensions. The file name extension of each file depends on the type of the file. For example, one still picture unit may include a JPEG image file named '01001.JPG', a graphic image file named '01001.GRP', and a subtitle data file named '01001.SUT'.

As further shown in FIG. 3, a still picture map (SP_map) is included in the clip information file associated with the clip file. The still picture map specifies the display sequence of the still picture units. Specifically, the still picture map (SP_map) contains a list of still image file names for specifying the display sequence of still picture units. In the list, the file names are arranged in the same order that the still picture units are to be displayed, for example, such as in a slideshow associated with the still picture map (SP_map).

The still picture map is associated with a playitem of a playlist for playback control of the still image files. A sub-playitem of the play list may be associated with an audio stream, which is recorded in a separate MPEG2 transport stream. As shown in FIG. 3, the playitem (PlayItem) in the playlist contains in-picture (IN_picture) information and out-picture (OUT_picture) information corresponding respectively to the start position and end position of the still images in the still picture file to reproduce. As shown, the in-picture information and out-picture information provided by the playitem, link the playitem to the still picture map of a clip information file associated with the still picture clip file. As further shown, the sub-playitem (SubPlayItem) in the playlist contains sub-playitem in-time (SubPlayItem_IN_time) information and sub-playitem out-time (SubPlayItem_OUT_time) information for the separate audio file to be reproduced in association with the still picture file. The audio data may be reproduced in either a synchronized or unsynchronized fashion with the associated still images.

Figure 4:
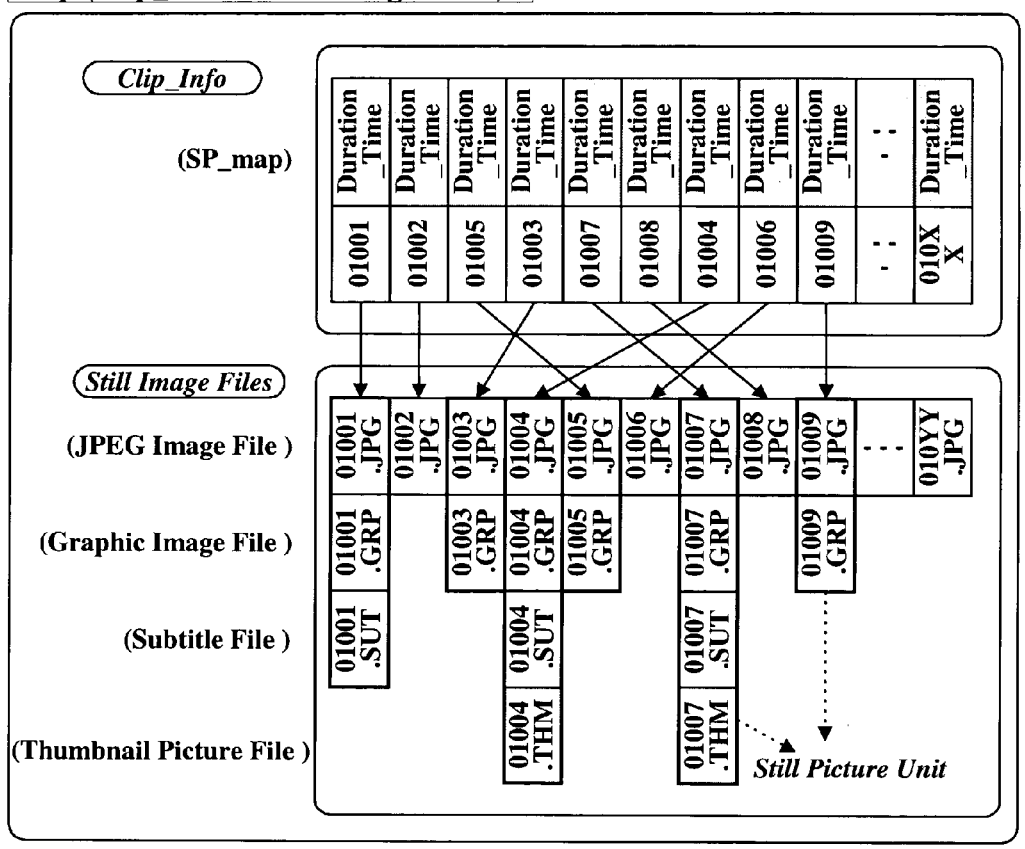
FIG. 4 illustrates an embodiment of the present invention in which display duration information is included in a still picture map.

As shown in FIG. 4, each SP map entry in the still picture map (SP_map) may additionally include display duration information for specifying the display duration of each still picture unit. The duration information indicates whether to display the associated still picture unit for a finite or infinite duration. When a finite duration is indicated, the length of the finite duration may be provided. When an infinite duration is indicated, a reproducing apparatus reproduces the still picture unit for displayed until user input to the contrary is received.

Also as shown in FIG. 4, a still picture unit may include various types of still images (e.g., JPEG images, thumbnail pictures, etc.) along with the related data such as graphic data, subtitle data, etc.

Figure 5:
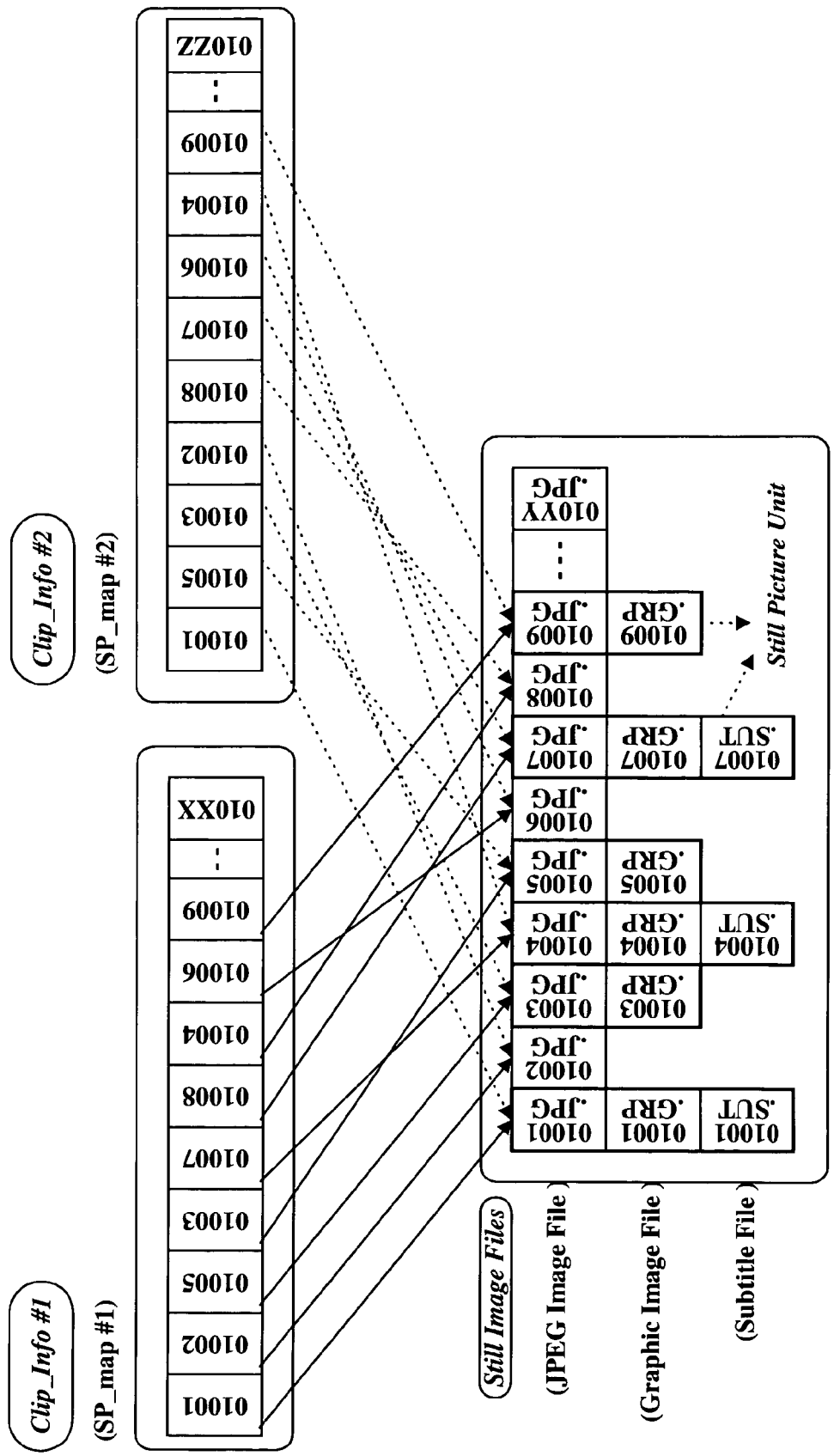
FIG. 5 illustrates an embodiment of the present invention in which a set of still image files is associated with two still picture maps.

FIG. 5 illustrates that a set of still picture files may be associated with more than one still picture map. In FIG. 5, still picture files are associated with both SP_map #1 included in Clip_Info #1 and SP_map #2 included in Clip_Info #2. The order of listed image file names in SP_map #1 may differ from that in SP_map #2.

Because there are multiple still picture maps for the same set of still image files, the same still picture units may be presented in different orders. In this case, the display duration information for still picture units is included in a playlist or a playitem associated with the corresponding still picture map as shown in FIG. 6 described in detail below.

Figure 6:
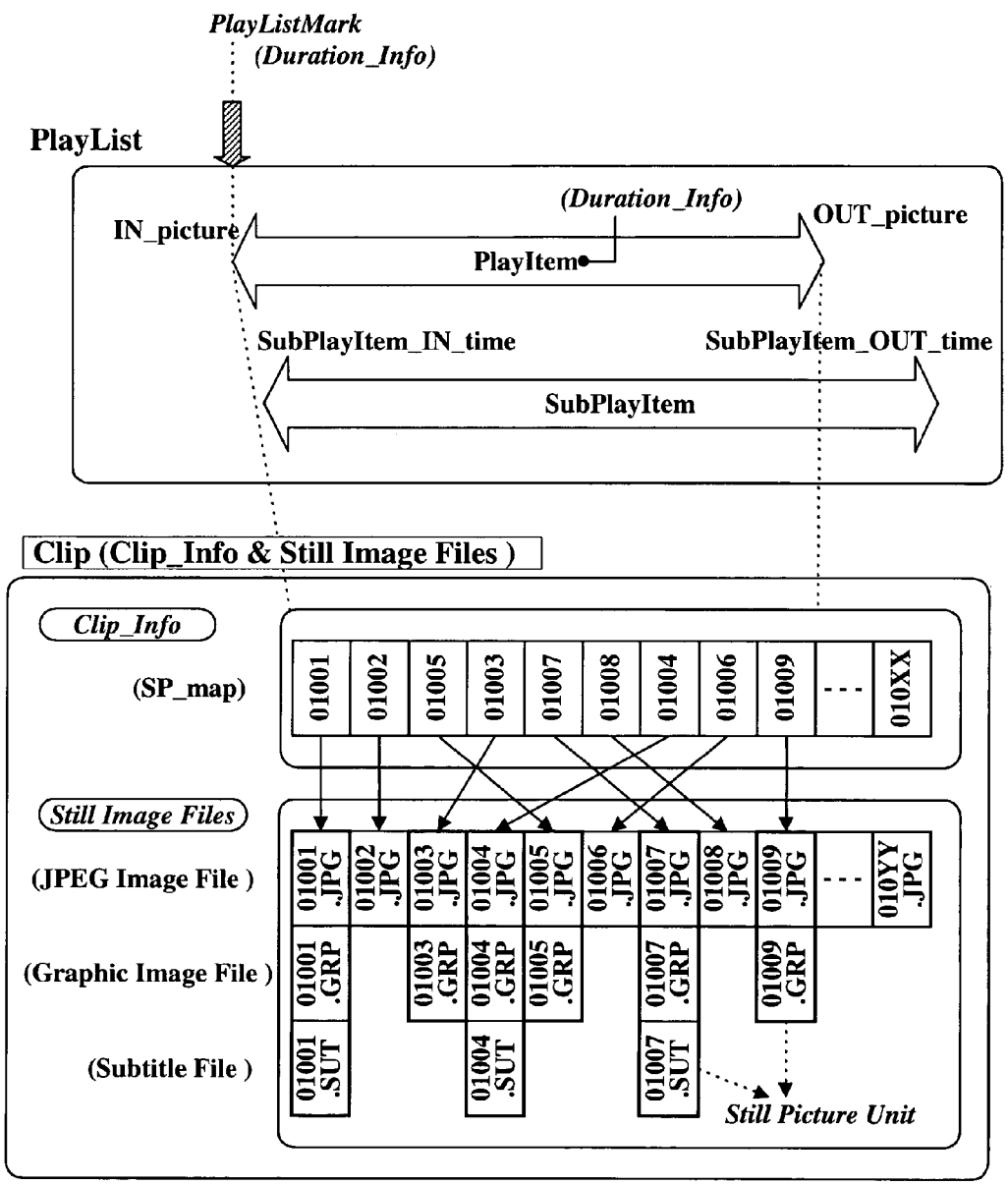
FIG. 6 illustrates an embodiment of the present invention in which display duration information is included in a playlist or a playitem.

As shown in FIG. 6, a playitem (PlayItem) in the playlist contains in-picture (IN_picture) information and out-picture (OUT_picture) information corresponding respectively to the start position and end position of the still images in the still picture file to reproduce. As shown, the in-picture information and out-picture information provided by the playitem, link the playitem to the still picture map of a clip information file associated with the still picture clip file. As further shown, a sub-playitem (SubPlayItem) in the playlist contains sub-playitem in-time (SubPlayItem_IN_time) information and sub-playitem out-time (SubPlayItem_OUT_time) information for, for example, a separate audio file (not shown) to be reproduced in association with the still picture file. The audio data may be reproduced in either a synchronized or unsynchronized fashion with the associated still images.

The playlist also includes a number of playlist marks PlayListMark. A playlist mark points to the beginning of a still picture unit and may provide duration information for the associated still picture unit such as discussed above. For example, the display duration for each still picture unit may be recorded in the duration information field of a playlist mark included in the associated playlist. Alternatively, or additionally, a duration information field may be included in the associated playitem and the duration information included in this duration information field. The duration information indicates whether to display the associated still picture unit for a finite or infinite duration. When a finite duration is indicated, the length of the finite duration may be provided. When an infinite duration is indicated, a reproducing apparatus reproduces the still picture unit for displayed until user input to the contrary is received.

If the playitem provides navigation information for reproducing more than one still picture unit and the display duration varies from still picture unit to still picture unit, the display duration information for the still picture units may be stored as a list in the playitem; otherwise, the display duration information may be recorded as 1-byte data. In this case, an additional flag, for example, 'Share_flag' may be assigned to specify which of these two duration information methods is valid.

Figure 7:
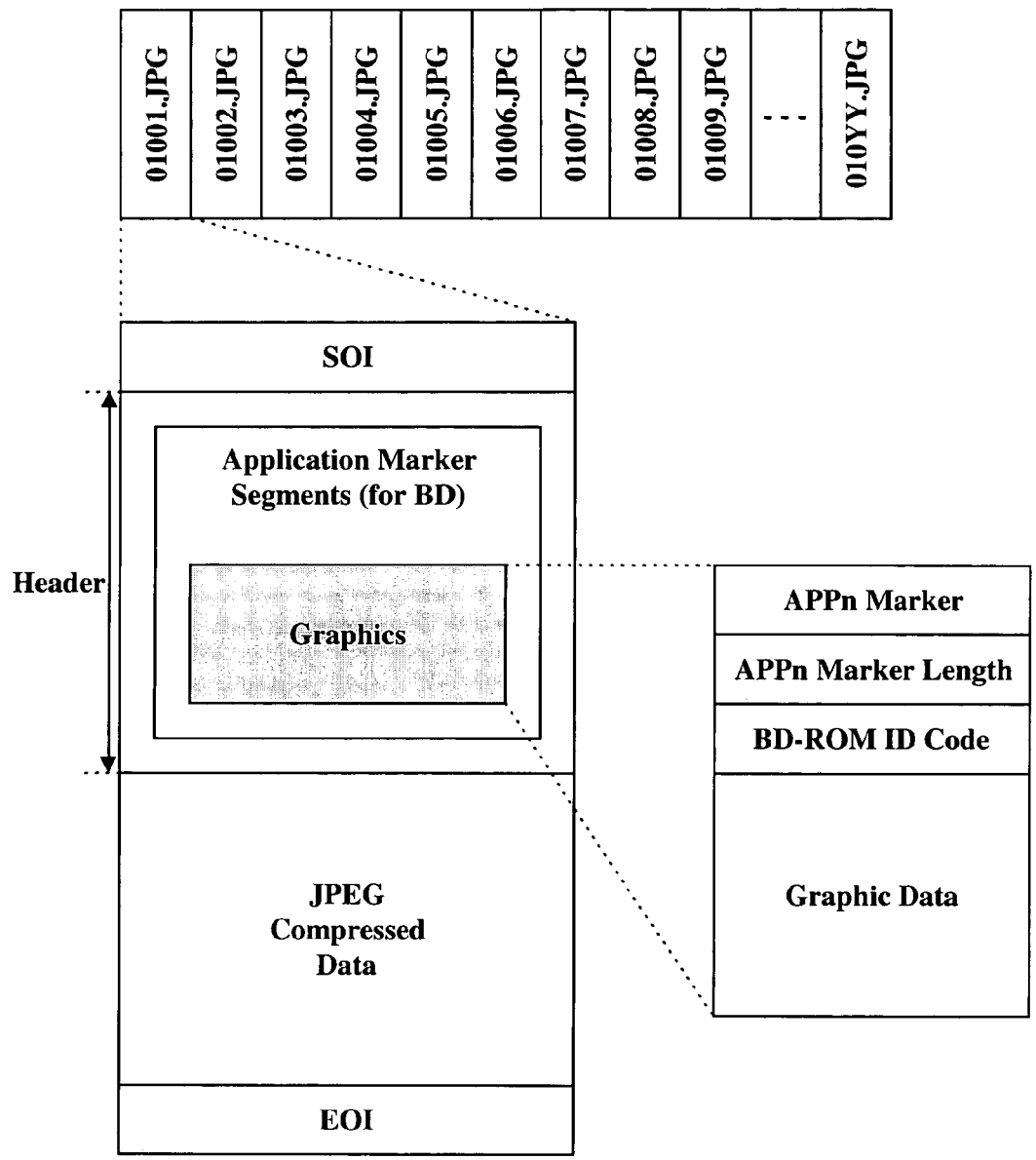
FIG. 7 illustrates a JPEG file containing graphic data.

FIG. 7 illustrates a JPEG file containing graphic data. As shown, the header of a JPEG still image file (e.g., 01001.JPG) may include graphic image data along with an application marker, an application marker length, and a BD-ROM ID code. The JPEG image data and graphic data are created individually and then merged into one single JPEG file. A graphic image data stream is recorded as one graphic unit in a graphic file (*.GRP), wherein the whole PES (packetized elementary stream) packet or only the payload of the PES packet is recorded.

Figure 8:
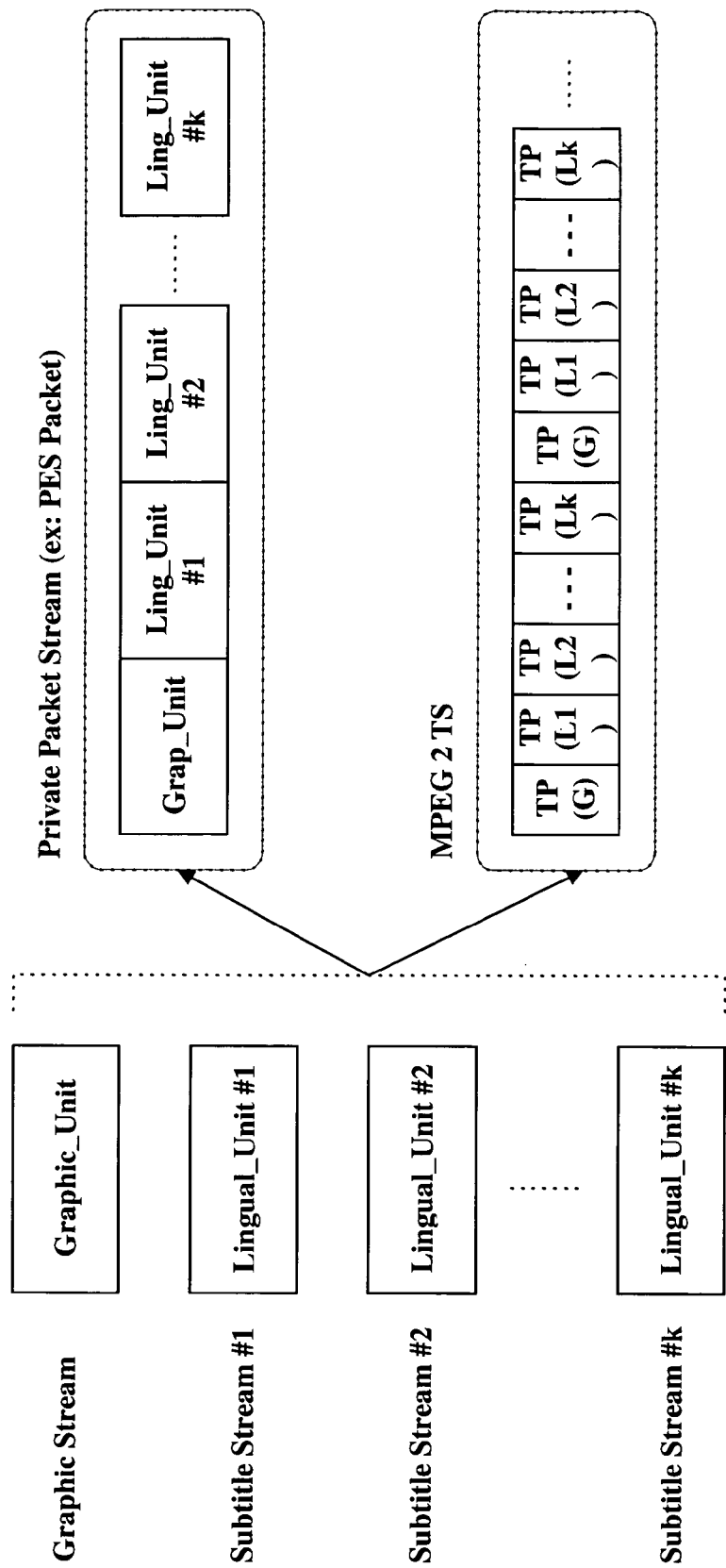
FIG. 8 illustrates a private packet stream and MPEG2 transport stream into which one graphic data and a plurality of subtitle data are multiplexed.

FIG. 8 illustrates a private packet stream and MPEG2 transport stream into which one graphic data and a plurality of subtitle data are multiplexed. As shown, the graphic file may include one graphic unit and multiple lingual units (Lingual_Unit #1~#k) that correspond to multiple language subtitle data streams (Subtitle #1~#k). In the graphic file, the graphic unit and multiple lingual units may be recorded sequentially as a private packet stream or may be recorded as an MPEG2 transport stream comprising transport packets.

Figures 9, 10:
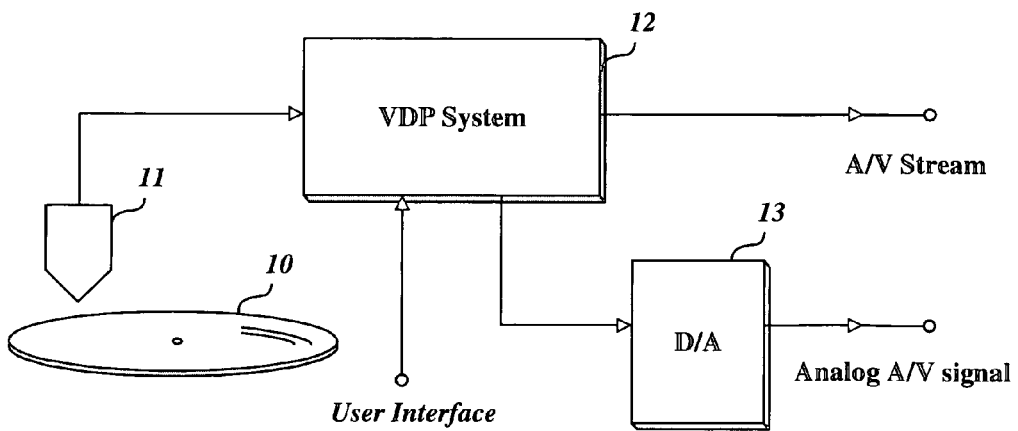
FIG. 9 illustrates the structure of a PES packet in accordance with the invention.
FIG. 10 illustrates a schematic diagram of a partial structure of an optical disc reproducing apparatus where the present invention may be applied.

FIG. 9 illustrates the structure of a PES packet in accordance with the invention. As shown, the display time of the subtitle data is determined by a presentation time stamp (PTS) and a decoding time stamp (DTS) included in the header of the corresponding PES packet. In a browsable slideshow, in which the display duration of each still image depends on user key input (e.g., is displayed until user input to the contrary is received), the presentation time stamp is meaningless and thus set to '0x00000000'.

As further shown in FIG. 9, the payload of the PES packet may include cut-in time and cut-out time information for the subtitle data. The cut-in time and cut-out time information, which specifies when to show and to vanish the subtitle, is time information given relative to the presentation time stamp (PTS).

FIG. 10 illustrates a schematic diagram of a partial structure of an optical disc apparatus where the present invention may be applied. As shown, the optical disc apparatus includes an optical pickup 11 for reproducing data from an optical disk. A VDP (Video Disc Play) system 12 controls the reproduction operation of the optical pickup 11 and demodulates the data reproduced by the optical pickup 11. The VDP 12 produces an AV stream, which may also be fed to a D/A converter 13 to generate an analog version of the AV stream.

The VDP system 12 controls the optical pickup 11 and demodulates the reproduced data based on user input received from a user interface and the navigation and management information recorded on the optical disk in accordance with the present invention. For example, to perform a slideshow, the VDP system 12 refers to the still picture map (SP_map) and reproduces still picture images, the names of which are included in the still picture map (SP_map) in the order that the still picture units are to be reproduced and displayed. The VDP system 12 may reproduce each still picture unit for a finite or infinite duration according to the duration information supplied as set forth in any of the above embodiments.

Figure 11:
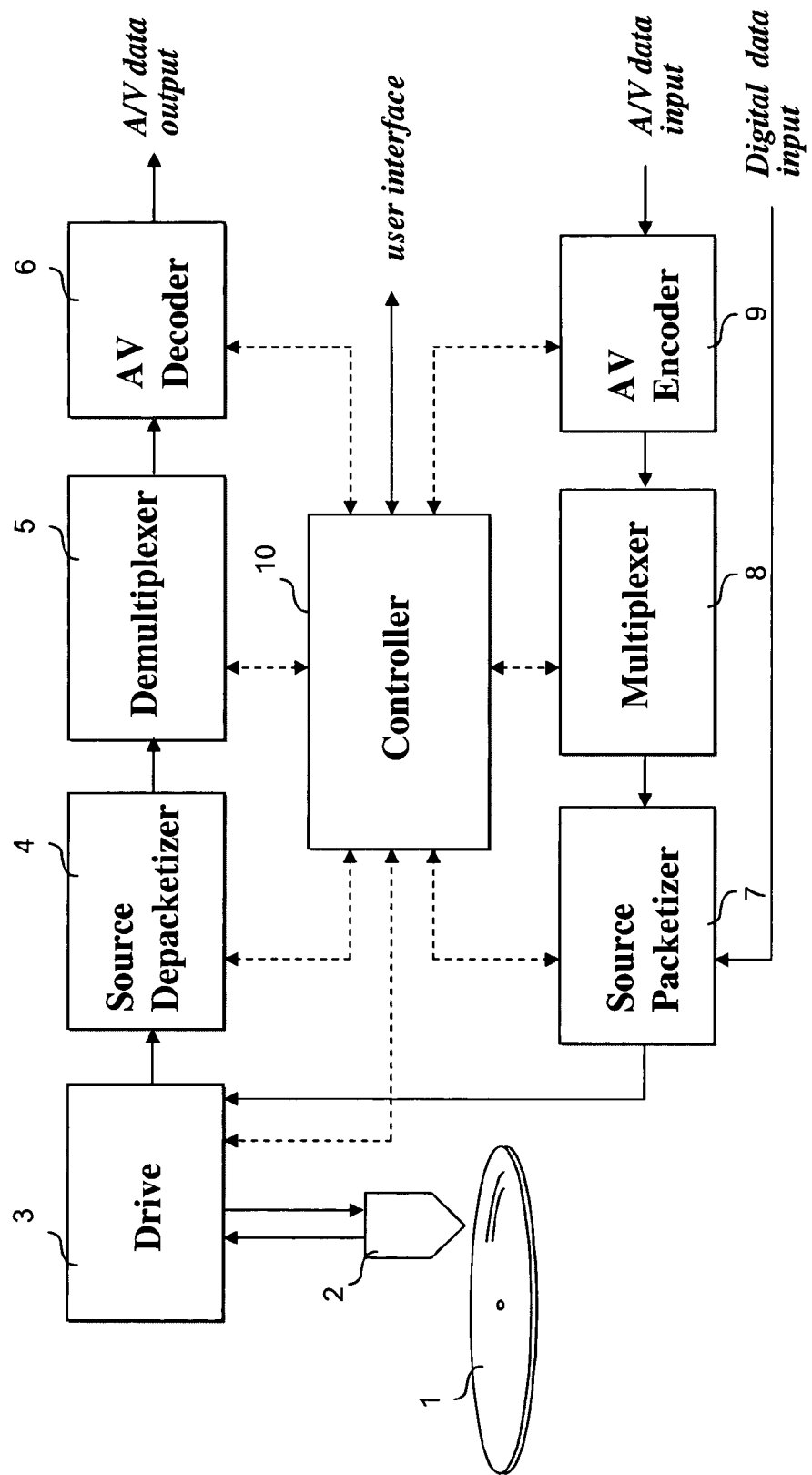
FIG. 11 illustrates another embodiment of a recording and reproducing apparatus according to the present invention.

FIG. 11 illustrates a schematic diagram of an embodiment of an optical disk recording and reproducing apparatus according to the present invention. As shown, an AV encoder 9 receives and encodes data (e.g., still image data, audio data, etc.). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 11, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the data being recorded on the optical disk. For example, based on information received via the user interface (e.g., instruction set saved on disk, provided over an intranet or internet by a computer system, etc.) the controller 10 controls the drive 3 to record one or more of the data structures of FIGS. 1-9 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk. For example, as discussed above with respect to the embodiments of the present invention, a still image or still images may be reproduced in association with audio data based on the navigation information. Furthermore, an image or group of images may be reproduced as a slideshow or portion of a slideshow. As also discussed, a slideshow may be synchronized, browsable, etc.

The reproduced source packets are received by a source depacketizer 4 and converted into a data stream (e.g., an MPEG-2 transport packet stream). A demultiplexer 5 demultiplexes the data stream into encoded data. An AV decoder 6 decodes the encoded data to produce the original data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 11 has been described as a recording and reproducing apparatus, it will be understood that only a recording or only a reproducing apparatus may be provided using those portions of FIG. 11 providing the recording or reproducing function.

As will be appreciated from the forgoing disclosure, the present invention provides a recording medium having a data structure for managing still images recorded on a high-density recording medium (e.g., a high-density optical disk such as a BD-ROM). For example, the data structure allows for displaying still images and possibly audio data in various ways.

The method of managing still images for a high-density recording medium in accordance with the invention provides various still control operations such as duration management and allows effective linked reproduction of still images along with associated subtitle data or graphic images.

As apparent from the above description, the present invention provides methods and apparatuses for recording a data structure on a high density recording medium for managing still images recorded on the recording medium.

The above description further provides methods and apparatus for reproducing still images recorded on a high density recording medium based on a data structure, also recorded on the high density recording medium, for managing the reproduction of still images.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A non-transitory computer readable medium having a data structure for managing reproduction duration of at least one still picture, comprising:
    a data area storing first stream file including presentation data and second stream file including audio data, the presentation data being divided into at least one still picture unit, the at least one still picture unit including at least one still picture and associated graphic data; and
    a playlist area storing at least one playlist file, the at least one playlist file including at least one playitem and at least one sub-playitem, the at least one playitem indicating an in-point and an out-point of the first stream file to reproduce the presentation data and including first duration information indicating whether to display the at least one still picture in the at least one still picture unit for one of a finite and an infinite period of time, the at least one sub-playitem indicating an in-point and an out-point of the second stream file to reproduce the audio data,
    wherein the at least one playitem further includes second duration information indicating a length of time to display the at least one still picture when the first duration information indicates to display the at least one still picture for a finite period of time, wherein the at least one still picture and associated graphic data in the at least one still picture unit are reproduced synchronously based on the at least one playitem, wherein the audio data is reproduced independently from the at least one still picture unit based on the at least one sub-playitem, wherein the stream files and the playlist file are separate from each other and have different file extensions.

2. The non-transitory computer readable medium of claim 1, wherein the at least one still picture unit includes only one still picture.

3. A method of recording a data structure for managing reproduction duration of at least one still picture on a recording medium, comprising:

recording first stream file including presentation data and second stream file including audio data on the recording medium, the presentation data being divided into at least one still picture unit, the at least one still picture unit including at least one still picture and associated graphic data; and recording at least one playlist file on the recording medium, the at least one playlist file including at least one playitem and at least one sub-playitem, the at least one playitem indicating an in-point and an out-point of the first stream file to reproduce the presentation data and including first duration information indicating whether to display the at least one still picture in the still picture unit for one of a finite and an infinite period of time, the at least one sub-playitem indicating an in-point and an out-point of the second stream file to reproduce the audio data, wherein the at least one playitem further includes second duration information indicating a length of time to display the at least one still picture when the first duration information indicates to display the at least one still picture for a finite period of time, wherein the at least one still picture and associated graphic data in the at least one still picture unit are reproduced synchronously based on the at least one playitem, wherein the audio data is reproduced independently from the at least one still picture unit based on the at least one sub-playitem, wherein the stream files and the playlist file are separate from each other and have different file extensions.

4. A method of reproducing a data structure for managing reproduction duration of at least one still picture recorded on a recording medium, comprising:

reproducing at least one playitem and at least one sub-playitem being included in a playlist file, the at least one playitem indicating an in-point and an out-point of a first stream file to reproduce presentation data, the at least one sub-playitem indicating an in-point and an out-point of a second stream file to reproduce audio data, wherein the playitem includes first duration information and second duration information, the first duration information indicating whether to display at least one still picture in at least one still picture unit for one of a finite and an infinite period of time, the second duration information indicating a length of time to display at least one still picture when the first duration information indicates to display the at least one still picture for a finite period of time;

reproducing the presentation data in the first stream file based on the playitem, the presentation data being divided into the at least one still picture unit, the at least one still picture unit including at least one still picture and associated graphic data, wherein the at least one still picture and associated graphic data in the still picture unit are reproduced synchronously based on the at least one playitem; and reproducing the audio data in the second stream file based on the at least one sub-playitem, wherein the audio data is reproduced independently from the at least one still picture unit based on the at least one sub-playitem, wherein the stream files and the playlist file are separate from each other and have different file extensions.

5. An apparatus for recording a data structure for managing reproduction duration of at least one still picture on a recording medium, comprising:

a pickup configured to record data on the recording medium;

a controller configured to control the pickup to record first stream file including presentation data and second stream file including audio data on the recording medium, the presentation data being divided into at least one still picture unit, the at least one still picture unit including at least one still picture and associated graphic data; and configured to control the pickup to record at least one playlist file on the recording medium, the at least one playlist file including at least one playitem and at least one sub-playitem, the at least one playitem indicating an in-point and an out-point of the first stream file to reproduce the presentation data and including first duration information indicating whether to display the at least one still picture in the at least one still picture unit for one of a finite and an infinite period of time, the at least one sub-playitem indicating an in-point and an out-point of the second stream file to reproduce the audio data, wherein the at least one playitem further includes second duration information indicating a length of time to display the at least one still picture when the first duration information indicates to display the at least one still picture for a finite period of time, wherein the at least one still picture and associated graphic data in the at least one still picture unit are reproduced synchronously based on the at least one playitem, wherein the audio data is reproduced independently from the at least one still picture unit based on the at least one sub-playitem, wherein the stream files and the playlist file are separate from each other and have different file extensions.

6. An apparatus for reproducing a data structure for managing reproduction duration of at least one still picture recorded on a recording medium, comprising:

a pickup configured to reproduce data recorded on the recording medium;

a controller configured to control the pickup to reproduce first stream file including presentation data and second stream file including audio data from the recording medium, the presentation data being divided into at least one still picture unit, the at least one still picture unit including at least one still picture and associated graphic data; and configured to control the pickup to reproduce at least one playlist file from the recording medium, the at least one playlist file including at least one playitem and at least one sub-playitem, the at least one playitem indicating an in-point and an out-point of the first stream file to reproduce the presentation data and including first duration information indicating whether to display the at least one still picture in the at least one still picture unit for one of a finite and an infinite period of time, the at least one sub-playitem indicating an in-point and an out-point of the second stream file to reproduce the audio data, wherein the at least one playitem further includes second duration information indicating a length of time to display the at least one still picture when the first duration information indicates to display the at least one still picture for a finite period of time, wherein the at least one still picture and associated graphic data in the at least one still picture unit are reproduced synchronously based on the at least one playitem, wherein the audio data is reproduced independently from the at least one still picture unit based on the sub-playitem, wherein the stream files and the playlist file are separate from each other and have different file extensions.

7. An apparatus for reproducing a data structure for managing at least one still picture recorded on a recording medium, comprising:

a pickup configured to reproduce data recorded on the recording medium;

a controller configured to control the pickup to reproduce at least one playitem and at least one sub-playitem being included in a playlist file, the at least one playitem indicating an in-point and an out-point of a first stream file to reproduce presentation data, the at least one sub-playitem indicating an in-point and an out-point of a second stream file to reproduce audio data;

the controller configured to control the pickup to reproduce the presentation data in the first stream file based on the playitem, the presentation data being divided into the at least one still picture unit, the at least one still picture unit including at least one still picture and associated graphic data, wherein the at least one still picture and associated graphic data in the still picture unit are reproduced synchronously based on the at least one playitem; and the controller configured to control the pickup to reproduce the audio data in the second stream file based on the at least one sub-playitem, wherein the audio data is reproduced independently from the at least one still picture unit based on the at least one sub-playitem, wherein the stream files and the playlist file are separate from each other and have different file extensions.

* * * * *